United States Patent Office 3,253,002
Patented May 24, 1966

3,253,002
SELECTIVE OXIDATION OF THE LEUCOANTHRA-QUINONOID NUCLEUS IN THE PRESENCE OF A HYDROQUINONOID SUBSTITUENT WITH ADSORBED OXYGEN ON CARBON
Charles E. Jandrue, Roslindale, Myron S. Simon, Newton Center, and Henry T. Wolosinski, Lexington, Mass., assignors to Polaroid Corporation, Cambridge, Mass., a corporation of Delaware
No Drawing. Filed May 28, 1963, Ser. No. 283,706
10 Claims. (Cl. 260—380)

This application is in part a continuation of our copending application Serial No. 36,499, filed June 16, 1960, now abandoned.

The present invention is concerned with chemical processes and more particularly with processes for oxidizing leucoanthraquinone dyes to the corresponding anthraquinone dyes.

One object of the invention is to provide processes for oxidizing leucoanthraquinone dyes to anthraquinone dyes.

Another object is to provide processes for selectively oxidizing the leucoanthraquinone nucleus of a leucoanthraquinone dye which contains other oxidizable moieties in addition to said leucoanthraquinone nucleus.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

In the preparation of anthraquinone dyes, the dye is often first produced in the leuco form and then oxidized to the anthraquinone or, if produced as the anthraquinone, it may be purified by reduction to the leuco form followed by reoxidation. In the past, the oxidation has been generally carried out by a wide variety of methods varying from heating in concentrated sulfuric acid at high temperatures, with or without other oxidants present, to the relatively mild method of bubbling air through the leucoanthraquinone solution. Such aerial oxidations, although considered mild, have been found in some cases to oxidize other moieties present in the dye in addition to the nucleus. The present invention is concerned with providing processes for selectively oxidizing the nucleus.

The objects of the present invention are carried out by using carbon black having adsorbed oxygen thereon and especially activated carbons having adsorbed oxygen thereon as the oxidizing agent. It has been found that such carbons will selectively oxidize the leucoanthraquinone nucleus without oxidizing other oxidizable moieties which may be present, such as ortho- or para-dihydroxyphenyl groups. It is believed that the carbons bring about the selective oxidation by controlling the availability of the active oxygen.

The oxidation processes of the present invention have been found especially useful to oxidize leucoanthraquinone dye developers to anthraquinone dye developers. Dye developers may be defined as compounds which are both dyes and developers of exposed silver halide emulsions. They may be further defined as being compounds which contain within the same molecule the chromophoric system of a dye and also a silver halide developing function. A preferred class of anthraquinones are those which comprise an anthraquinone nucleus which is substituted by radicals which in turn contain silver halide developer radicals, e.g., hydroquinonyl, catechol, etc., radicals. In a preferred embodiment of such compounds the silver halide developing radical is joined to the anthraquinone nucleus through an amino substituent on said nucleus and especially through an alkylamino group. Anthraquinone dye developers are disclosed in United States patents and copending United States applications such, for example, as U.S. Patent No. 2,983,605, issued to Richard S. Corley on May 9, 1961; U.S. Patent No. 3,047,386, issued to Elkan R. Blout and Myron S. Simon on July 31, 1962; the copending application of Elkan R. Blout and Myron S. Simon, Serial No. 680,619, filed August 27, 1957, now abandoned; and the copending application of Elkan R. Blout, Marilyn R. Cohler, Milton Green, Myron S. Simon and Robert B. Woodward, Serial No. 824,786, filed July 3, 1959, now abandoned and replaced by application Serial No. 318,827, filed October 25, 1963. As examples of such developers mentioned may be made of:

1,4-bis-(α-methyl-β-hydroquinonyl-ethylamino)-5,8-dihydroxyanthraquinone.
1-(α-hydroxymethyl-propylamino)-4-(α-methyl-β-hydroquinonyl-ethylamino)-anthraquinone.
1-(α-hydroxymethyl-propylamino)-4-(α-methyl-β-hydroquinonyl-ethylamino)-5,8-dihydroxyanthraquinone.
1-hydroxy-4-(α-methyl-hydroquinonylethylamino)-anthraquinone.
1,4-bis-(α-methyl-γ-hydroquinonylpropylamino)-anthraquinone.
1,4-bis-hydroquinonylmethylamino-anthraquinone.
1,4-bis-(α-methyl-β-hydroquinonylethylamino)-6,7-dichloroanthraquinone.
1-(α-methyl-β-hydroquinonylethylamino)-4-(α-ethyl-β-hydroquinonylethylamino)-anthraquinone.
1-(α-methyl-β-hydroquinonylethylamino)-4-(α-ethyl-β-hydroquinonylethylamino)-5,8-dihydroxyanthraquinone.
1,4-bis-(α-methyl-2',5'-dihydroxybenzylamino)-anthraquinone.
1,4-bis-(α-methyl-β-hydroquinonylethylamino)-5,8-bis-benzene-sulfonamido-anthraquinone.
1,4-bis-(α-methyl-β-hydroquinonylethylamino)-5-hydroxy-8-amino-anthraquinone.
1,4-bis-(α-methyl-β-hydroquinonylethylamino)-5-hydroxyanthraquinone.
1,4-bis-(β-hydroquinonyl-ethylamino)-anthraquinone.
1-(α-hydroxymethyl-propylamino)-4-[β-(4'-methyl-2',5'-dihydroxyphenyl)-α-methyl-ethylamino]-anthraquinone.
1-ethylamino-4-[β-(3',4'-dihydroxyphenyl)-ethylamino]-anthraquinone.
1-hydroxy-4-[β-(3',4'-dihydroxyphenyl)-ethylamino]-anthraquinone.
1,4-bis-[β-(3',4'-dihydroxyphenyl)-ethylamino]-5,8-dihydroxyanthraquinone.
1-(β-hydroxyethylamino)-4-(β-hydroquinonylethylamino)-anthraquinone.
1,4-bis-[β-(3',4'-dihydroxyphenyl-ethylamino]-anthraquinone.
1-(β-hydroxyethylamino)-4-(α-methyl-β-hydroquinonylethylamino)-5,8-dihydroxyanthraquinone.
1,4-bis-(α-ethyl-β-hydroquinonylethylamino)-anthraquinone.
1-methylamino-4-(β-hydroquinonylethylamino)-anthraquinone.
1-β-hydroxyethylamino-4-(α-methyl-β-hydroquinonylethylamino)-anthraquinone.
1,4-bis-(2',5'-dihydroxyanilino)-anthraquinone.
N-monobenzoyl-1,4-bis-[β-(3',4'-dihydroxyphenyl)-ethylamino]-anthraquinone.
N-monobenzoyl-1,4-bis-[β-(2',5'-dihydroxyphenyl)-ethylamino]-anthraquinone.
}

4-[1',5'-bis-(2",5"-dihydroxyphenyl)-3'-pentyl]-amino-1-hydroxyanthraquinone.

1,4-bis-[1',5'-bis-(2",5"-dihydroxyphenyl)-3'-pentylamino]-anthraquinone.

It should be noted that the above-mentioned anthraquinones contain radicals such, for example, as ortho- and para-dihydroxyphenyl radicals which are readily oxidizable and, as is known, are capable of developing exposed silver halide emulsions. In order to preserve the developing ability of such radicals, it is important, when preparing the dye developers from the leucoanthraquinones through oxidation or by purifying them by reduction followed by oxidation, that the oxidation be limited to the leucoanthraquinone nucleus and not oxidize these radicals. The oxidizing agents, disclosed herein, bring about such a selective oxidation.

In carrying out the processes of the present invention, the leucoanthraquinone dye and the activated carbon are brought into intimate contact. In a preferred embodiment the dye is dissolved in an inert solvent and the activated carbon is added thereto. Since, as is known, the carbon will tend to settle, agitation should be employed throughout the reaction to keep the carbon suspended in the solution. The reaction may be speeded up, without endangering the selectivity, by carrying it out at a temperature in excess of room temperature. In a preferred embodiment the reaction is carried out at temperatures between about 40° C. to 120° C. and more preferably at between 100° C. and 120° C.

The carbons for use in the processes of the present invention may also be referred to as aerated carbons. Most of the commercially available carbons adsorb sufficient oxygen during production and storage so as to be useful in the processes of the present invention. Such carbons are prepared by various methods such as those disclosed on page 147 of Inorganic Chemistry, by Fritz Ephraim, fifth edition (1949), edited by P. C. L. Thorne and E. R. Roberts, Interscience Publishers, Inc., New York, New York. Especially good results have been obtained with aerated activated charcoal, i.e., activated charcoal having adsorbed oxygen thereon. An activated carbon which has been found particularly useful in Norit FQP (Practical) P1731 (trade name for a highly adsorptive activated carbon distributed by Eastman Organic Chemicals, Distillation Products Industries, Rochester 3, New York). Another example of a useful activated carbon is Darco G-60 (trade name of Atlas Powder Co., Wilmington, Delaware). Usually, the amount of activated carbon used may be varied to suit particular needs and may be referred to as an effective amount. Especially good results have been obtained by using at least about 800 gms. of carbon per gram molecular weight of the leuco dye.

The following nonlimiting example illustrates the processes within the scope of the invention.

*Example 1*

27.4 gms. of leuco 1,4,5,8-tetrahydroxyanthraquinone, 57 gms. of 2-[2'-amino-propyl]-hydroquinone hydrobromide and 19.4 gms. of sodium bicarbonate were placed in 25 ml. of water and 500 ml. of 2-methoxyethanol and reacted under nitrogen with stirring for about 5 to 8 hours at reflux. 13–15 ml. of concentrated hydrochloric acid and 80 gms. of Norit FQP (Practical) P1731 were added and the mixture was reacted at reflux with stirring and under nitrogen until a spectrophotometric curve indicated the disappearance of the leuco bands (about 96 hours). The carbon was filtered from the hot (approximately 100° C.) solution under nitrogen and the product was precipitated into 2 liters of 10% hydrochloric acid. The precipitate was filtered, washed with water and dried under vacuum at 50° C. to 60° C. It was then taken up in a minimum of ethyl acetate, filtered, and precipitated into hexane and dried. A spectrophotometric visible curve of the product showed the following:

$\epsilon_{679m\mu} = 34{,}000$ to $36{,}500$

The dye developer, produced in the above example, readily developed an exposed silver halide emulsion, indicating that the hydroquinonyl radical was not oxidized.

In preferred embodiments of the present invention the reaction is carried out in a neutral or acid medium and more preferably in a slightly acid medium, e.g., pH of 5 to 7.

When the hydrochloric acid is added to the above reaction solution, at least part of it reacts with the sodium bicarbonate to give off carbon dioxide. As is known, such carbon dioxide is quite inert and does not take part in the oxidation reaction. In certain instances, it may be desirable, as the reaction proceeds, to add small additional amounts of the acid, e.g., 1 to 2 mls., to keep the medium slightly acid.

As will be understood, any inert acid, e.g., nonoxidizing acids, may be used in place of the hydrochloric acid to make the medium acid. As examples of useful acids, mention may be made of phosphoric, sulfuric, acetic and toluene sulfonic acids.

Although the above reaction was carried out in the inert methoxyethanol, it should be understood that other inert solvents may be employed. As examples of such solvents, mention may be made of N,N-dimethylformamide, dimethylsulfoxide, ethyl acetate, pyridine and ethoxyethanol.

In an especially useful embodiment of this invention the charcoal oxidation is carried out under a blanket of an inert gas such, for example, as nitrogen, carbon dioxide, etc. This blanket of inert gas serves to insure against aerial oxidation. It should be understood, however, that such a blanket may or may not be used, depending upon one's particular choice.

It should be further understood that the activated carbon may also serve to purify the dyes by adsorbing impurities.

The dye developers produced by the processes of this invention may be used in photographic products, processes and compositions such as those disclosed in U.S. Patent No. 2,983,606, issued to Howard G. Rogers on May 9, 1961.

Since certain changes may be made in the above process without departing from the scope of the invention herein involved, it is intended that all matter contained in the above description shall be interpreted as illustrative and not in a limiting sense.

What is claimed is:

1. A process of selectivity oxidizing the leucoanthraquinone nucleus of a leucoanthraquinone compound which contains a radical selected from the group consisting of ortho- and para-dihydroxyphenyl radicals to form the corresponding anthraquinone dye without oxidizing said ortho- and para-dihydroxyphenyl radicals, said process comprising dissolving said leucoanthraquinone compound in an inert solvent and oxidizing the leucoanthraquinone nucleus at a temperature in excess of room temperature and below 120° C., using as the oxidizing agent an effective amount of activated carbon having adsorbed oxygen thereon.

2. A process as defined in claim 1 wherein said radical is a para-dihydroxyphenyl radical.

3. A process as defined in claim 1 wherein about 800 grams of said activated carbon is used per gram molecular weight of said leucoanthraquinone compound.

4. A process as defined in claim 1 wherein said process is carried out at a temperature between about 40° to 120° C.

5. A process as defined in claim 1 wherein said process is carried out under a blanket of an inert gas.

6. A process as defined in claim 1 wherein said process is carried out in an acid medium.

7. A process of selectively oxidizing the leucoanthraquinone nucleus of a leucoanthraquinone compound which contains a radical selected from the group consisting of ortho- and para-dihydroxyphenyl radicals to form the corresponding anthraquinone compound without oxidizing said ortho- and para-dihydroxyphenyl radicals, said process comprising dissolving said leucoanthraquinone compound in an inert solvent and oxidizing said leucoanthraquinone compound under an inert atmosphere in an acid medium at a temperature of about 40° C. to 120° C., using as the oxidizing agent an effective amount of activated carbon having adsorbed oxygen thereon.

8. A process as defined in claim 7 wherein about 800 grams of said activated carbon is used per gram molecular weight of said leucoanthraquinone compound.

9. A process as defined in claim 1 wherein said radical selected from the group consisting of ortho- and para-dihydroxyphenyl radicals is joined to said leucoanthraquinone nucleus through an alkylamino radical.

10. A process as defined in claim 1 wherein said leuco compound is leuco-1,4-bis-($\alpha$-methyl-$\beta$-hydroquinonyl-ethylamino)-5,8-dihydroxy-anthraquinone.

References Cited by the Examiner
UNITED STATES PATENTS

| | | | |
|---|---|---|---|
| 2,185,709 | 1/1940 | Ogilvie et al. | 260—380 X |
| 2,207,045 | 7/1940 | Wilder | 260—380 X |
| 2,228,885 | 1/1941 | Olpin | 260—380 |

OTHER REFERENCES

Courty: "Chem. Abstracts," vol. 42, page 1102 (1948).

Voet et al.: "Am. Ink Maker," vol. 38, No. 9, pp. 44–46, 51 and 78 (1960).

LORRAINE A. WEINBERGER, *Primary Examiner.*